UNITED STATES PATENT OFFICE.

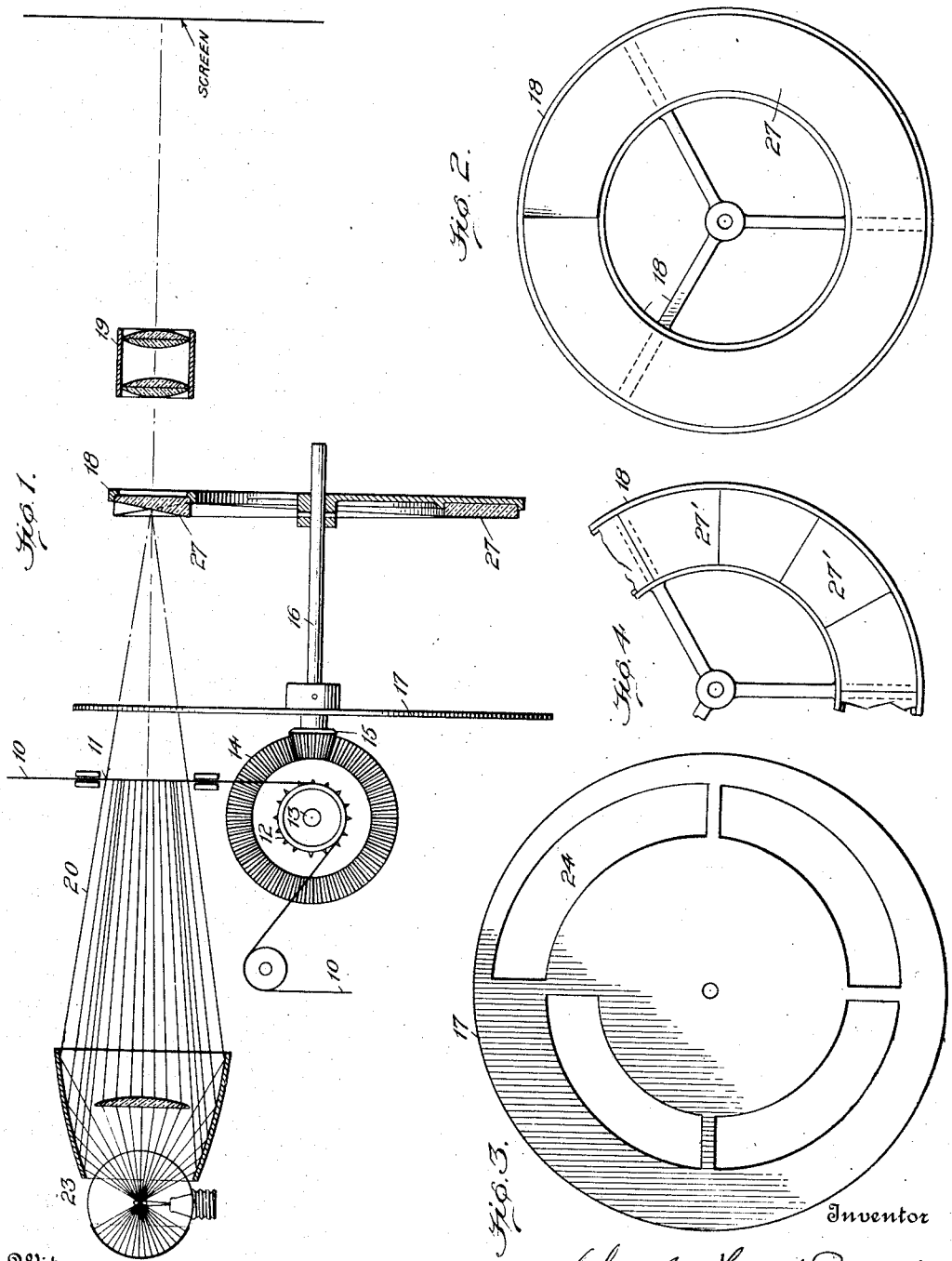

CHARLES FRANCIS JENKINS, OF WASHINGTON, DISTRICT OF COLUMBIA.

MOTION-PICTURE MACHINE.

1,385,325.  Specification of Letters Patent.  Patented July 19, 1921.

Application filed October 23, 1919. Serial No. 332,742.

*To all whom it may concern:*

Be it known that I, CHARLES FRANCIS JENKINS, a citizen of the United States, and resident of Washington, in the District of Columbia, have invented certain new and useful Improvements in Motion-Picture Machines, of which the following is a specification, reference being had therein to the accompanying drawing.

The general object of this invention is to provide means whereby pictures on a constantly advancing motion picture film may be satisfactorily projected upon a screen by mechanism having no intermittent motion, and a further object is to do this by simple devices preferably such as may be readily used with slightly changed ordinary projecting devices.

The desired end is reached by deflecting the projecting rays through progressively varying angles so that as the picture moves across the ordinary exposure opening it constantly appears at the same point on the screen. At the end of the projecting interval, corresponding to the rest period of step by step machine, the deflecting devices assume initial position and repeat their action while a second picture is exposed and so on.

In the accompanying drawings,

Figure 1 is a diagrammatic side elevation partly in section showing parts of a projecting machine provided with my devices.

Fig. 2 is a face view of a one-piece beam deflecting member, suitably mounted.

Fig. 3 is a face view of a shutter.

Fig. 4 shows a portion of a similar member made up of many pieces.

In these views, 10 represents the usual film which is constantly advanced past an exposure opening 11 preferably of double height, by a sprocket drum 12 upon a drive shaft 13. Upon the shaft 13 is mounted a gear 14 which engages a pinion 15 on a shaft 16 which bears a shutter 17 and a prism plate or frame 18, and beyond the prism frame a projecting lens 19 is fixed in the axis of the projecting beam 20 from a source of light 23. The frame 18 carries what may be called an annular prism 21 the medial line of which passes through or near the projecting axis, or axis of the beam and projecting lens. This prism progressively varies in cross section, the outer portion being, at an initial radial line, much thinner than the portion nearer the axis of rotation and gradually increasing in thickness while the inner portion correspondingly decreases until when that line is again reached the outer side has substantially the initial thickness of the inner side and vice versa. In this change, at a point diametrically opposite said initial radial line the outer and inner sides of the annular prism are of the same thickness, and at this point the beam passes through without deflection, as it should when the picture has passed half way across the exposure opening. The prism's gradual change in form on each side of this point is such that the rays are so bent, progressively, that the picture does not change its position on the screen. It follows that each point of the picture on the film remains at the same point on the screen while film moves across the exposure opening.

Coacting with this prism device the shutter 17 rotating at exactly the same speed and making one turn while a picture passes across the exposure opening, has a practically continuous spiral opening 24 so arranged that each picture having gradually advanced to position while covered by the shutter is suddenly fully exposed and projected while it advances one picture space and while the shutter makes a complete turn. It is then instantly covered by the same shutter movement that uncovers the succeeding picture. Meantime, during this exposure of each picture the annular prism is rotated at precisely the same rate and the light rays are progressively deflected by the prism so as to keep the picture at the same point on the screen.

The prism has been described as annular and may be so made at slight cost if molded or pressed into substantially the desired form and then finished. Obviously, if it were radially divided into segments, or were made up of such segments independently formed as shown in Fig. 4, its action would be substantially unchanged.

I have set forth the projection of the pictures of a constantly moving film because that is perhaps the most common use of the invention, but the apparatus by a well known sort of reversal, is also adapted for use in cameras, and the prism itself is usable for other purposes. It is therefore desired to claim the prism *per se*, and the apparatus broadly.

One face of the prism is shown as plane but this is not necessarily so, and it may be noted that the thickness of the prism along the middle line of its face is constant, but this again is not invariable, nor do both margins necessarily vary in thickness, the essential being that the cross section should vary progressively.

What I claim is:

1. An annular refracting prism of approximately rigid material having its thickness at one margin progressively varied, with respect to the thickness of the other margin and in passing along the circular curve, from a predetermined maximum to a predetermined minimum.

2. A rigid, annular, refracting, disk-like prism of progressively varying cross sectional shape having the radial lines on one of its faces meeting at different points the axial line perpendicular to the disk.

3. An annular refracting prism of rigid material having one marginal portion progressively decreased and the opposite marginal portion progressively increased in thickness in passing around the circle from a given point and further having its thickness uniform along a line approximately midway between said marginal portions.

4. An annular rigid refracting prism having its marginal thicknesses gradually changed, in passing along the curve of the prism, from a maximum at the outer margin and a corresponding minimum at the inner margin to a minimum at the outer margin and a corresponding maximum at the inner margin.

5. The combination with an annular, rigid, refracting prism having its thicknesses progressively changed, in passing along its curve to decrease the thickness at the outer margin from a maximum to a minimum while correspondingly increasing the thickness at the inner margin, of means for rotating the prism in its plane, means for projecting pictures through the rotating prism parallel to its axis, and a co-acting rotary shutter having a spiral opening and adapted to bar projecting rays.

6. A refracting annular prism of rigid material having its outer margin increased in thickness, progressively, in passing around the circle, and its inner margin correspondingly decreased in thickness in passing in the same direction.

7. The combination with an annular, rigid, refracting prism having its thicknesses progressively changed, in passing along its curve to decrease the thickness at the outer margin from a maximum to a minimum while correspondingly increasing the thickness at the inner margin, of means for rotating the prism in its plane, and means for projecting pictures through the rotating prism parallel to its axis.

In testimony whereof I hereunto affix my signature.

CHARLES FRANCIS JENKINS.